United States Patent
Campbell

(10) Patent No.: US 6,313,414 B1
(45) Date of Patent: Nov. 6, 2001

(54) SLOPE AND MOTION COMPENSATOR FOR WEIGHING ON A DYNAMIC PLATFORM

(75) Inventor: Ronald H. Campbell, Mendon, UT (US)

(73) Assignee: HarvestMaster, Inc., North Logan, UT (US)

( * ) Notice: Subject to any disclaimer, the term of this patent is extended or adjusted under 35 U.S.C. 154(b) by 0 days.

(21) Appl. No.: 09/497,219

(22) Filed: Jan. 31, 2000

(51) Int. Cl.$^7$ .......................... G01G 11/14; G01G 19/08; G01G 23/01; G01G 19/14

(52) U.S. Cl. ........................ 177/16; 177/136; 177/185; 73/1.13; 701/50; 702/174

(58) Field of Search .......................... 174/16, 119, 136, 174/184, 185; 701/50; 702/174, 101, 102; 177/50; 73/1.13

(56) References Cited

U.S. PATENT DOCUMENTS

| | | | |
|---|---|---|---|
| Re. 36,411 * | 11/1999 | Nakamura et al. | 177/185 |
| 2,279,041 | 4/1942 | Hadley | 265/5 |
| 2,659,564 | 11/1953 | Gibson | 249/58 |
| 2,882,036 | 4/1959 | Lyons | 265/28 |
| 2,939,569 | 6/1960 | Roach et al. | 198/37 |
| 3,163,248 | 12/1964 | Farquha | 177/132 |
| 3,656,337 * | 4/1972 | McDonald | 73/1.13 |
| 3,722,660 | 3/1973 | Snead | 198/39 |
| 3,736,997 | 6/1973 | Bottorf | 177/145 |
| 3,899,215 * | 8/1975 | Williams, Jr. et al. | 73/1.13 |
| 3,944,050 | 3/1976 | Kane | 198/37 |
| 3,961,247 | 6/1976 | Toki | 324/65 |
| 4,122,940 | 10/1978 | Hoffmann | 198/504 |
| 4,156,361 * | 5/1979 | Melcher et al. | 177/73 |
| 4,410,078 | 10/1983 | Shields et al. | 198/358 |
| 4,593,778 * | 6/1986 | Konishi et al. | 177/185 |
| 4,682,664 | 7/1987 | Kemp | 177/16 |
| 4,729,442 | 3/1988 | Sichet | 177/50 |
| 4,788,930 | 12/1988 | Matteau et al. | 177/16 |
| 4,792,003 * | 12/1988 | Hirano et al. | 177/50 |
| 4,926,359 * | 5/1990 | Konishi et al. | 177/185 |
| 5,111,896 | 5/1992 | Porcari et al. | 177/16 |
| 5,154,279 | 10/1992 | Hansch | 198/502.2 |
| 5,173,079 | 12/1992 | Gerrish | 460/7 |
| 5,178,226 | 1/1993 | Bowman et al. | 177/139 |
| 5,219,031 | 6/1993 | Brandt, Jr. | 177/145 |
| 5,294,756 | 3/1994 | Lauber et al. | 17/119 |
| 5,296,654 | 3/1994 | Farley et al. | 177/145 |
| 5,327,708 | 7/1994 | Gerrish | 56/1 |
| 5,384,436 | 1/1995 | Pritchard | 177/136 |
| 5,423,456 | 6/1995 | Arendonk et al. | 222/54 |
| 5,480,354 | 1/1996 | Sadjadi | 460/7 |
| 5,487,702 | 1/1996 | Campbell et al. | 460/7 |

(List continued on next page.)

Primary Examiner—Randy W. Gibson
(74) Attorney, Agent, or Firm—Workman, Nydegger & Seeley

(57) ABSTRACT

A weighing material on a moving platform by compensating for acceleration of the material and a variable slope of the platform. The system includes at least one weighing load cell and a reference load cell. The weighing load cell generates an output signal associated with a force applied to the weighing load cell by the material. The reference load cell is coupled with a reference mass, and provides the data from which a compensation multiplier can be calculated. The compensation multiplier is a value that is used to adjust the output of the weighing load cells to compensate for acceleration and variable slope, thereby generating the actual weight of the material. In order to calculate the compensation multiplier, an zero offset value of the reference load cell is determined prior to taking weight measurements of the material. The weighing systems can be used with substantially any moving vehicle that carries a material. Examples include vehicles having conveyors for carrying harvested crops or other materials, vehicles having a weigh chamber used to measure fixed volumes of crops, feed wagons, and other uses outside of agriculture.

42 Claims, 5 Drawing Sheets

U.S. PATENT DOCUMENTS

| | | | |
|---|---|---|---|
| 5,606,504 | 2/1997 | Anderson | 364/424.07 |
| 5,685,772 | 11/1997 | Anderson et al. | 460/6 |
| 5,695,354 | 12/1997 | Linville, Jr. et al. | 177/119 |
| 5,717,167 * | 2/1998 | Filing et al. | 177/136 |
| 5,753,866 | 5/1998 | Ikeda et al. | 177/25.18 |
| 5,789,713 * | 8/1998 | Wakasa et al. | 177/185 |
| 5,800,262 | 9/1998 | Anderson et al. | 460/6 |
| 5,870,686 | 2/1999 | Monsoon | 701/1 |
| 5,895,894 * | 4/1999 | Zumbach | 177/185 |
| 5,936,206 * | 8/1999 | Tajiri | 177/185 |
| 5,957,773 | 9/1999 | Olmsted et al. | 460/7 |
| 5,959,257 * | 9/1999 | Campbell et al. | 177/16 |
| 6,013,879 * | 1/2000 | Nakamura et al. | 177/184 |
| 6,066,809 * | 5/2000 | Campbell et al. | 177/16 |
| 6,150,617 * | 11/2000 | Hart et al. | 177/136 |

* cited by examiner

SLOPE AND MOTION COMPENSATOR FOR WEIGHING ON A DYNAMIC PLATFORM

BACKGROUND OF THE INVENTION

1. The Field of the Invention

The present invention relates systems and methods for measuring and weighing a moving mass. More particularly, the present invention relates to measuring and weighing a mass that is on a moving and/or sloped platform and subject to external forces other than the gravitational force.

2. The Prior State of the Art

A primary business goal is to maximize output or production while minimizing costs. With regard to agricultural operations maximizing output potentially includes measuring the weight or volume of a crop, collecting weight data while harvesting the crop to develop a crop yield map, and using the crop yield map to identify problem areas of an agricultural field. Maximizing output also includes ensuring that the vehicles used to transport a harvested crop to a destination are fully loaded but not overloaded. In many harvest scenarios, trucks are loaded as the crop is being harvested and an overloaded truck not only may damage the truck but may also incur overload penalties. In the alternative, a less than fully loaded truck is inefficient because more loads are needed to transport the crop to market.

The act of weighing the crop as it is harvested has presented many challenges which are related to the manner in which crops are harvested. For example, many agricultural vehicles such as harvesters use conveyors to transport a crop from the harvesting vehicle to a transport truck. Many different types of conveyors have been developed including augers and continuous belt or chain link devices, and while conveyors provide an effective method for loading crops onto trucks, they present various problems when the weight of the crop being harvested is measured.

It is inconvenient and inefficient for a conveyor to deposit the crops onto a static scale before loading the crops in a truck, because the crop must then be removed from the scale and because additional time and equipment are required to harvest the crop. Another approach for weighing a crop involves positioning the entire conveyor assembly on a scale platform and subtracting the weight of an empty conveyor from the measured weight of the crop and the conveyor. In any case, weighing accuracy is compromised due to the slope and motion of the machine.

Another method for determining the weight of a crop while it is being harvested is to monitor the power required by a conveyor to transport the crop from the harvester to a truck. These systems have proved problematic, especially on variable pitch conveyors. The power consumption of a conveyor assembly does not uniquely correspond to the weight of the material due to the variable friction forces of the system. Thus, it has proven difficult to accurately measure the weight of material carried on a conveyor using this method.

Weighing crops as they are being harvested or weighing other materials that are carried by moving vehicles has been difficult, due to dynamic forces (i.e. acceleration) and the variable slope of the vehicles. For example, a harvester that traverses a field is subjected to dynamic forces and has a variable angular position with respect to the horizontal plane as it encounters and moves over uneven terrain. Weighing harvested crops using a simple load cell under these conditions leads to inaccurate results due to both the dynamic forces associated with movement and the variable angle of the load cell. These problems associated with weighing material have also been experienced in other agricultural and industrial settings. For example, accurate measurements of animal feed, gravel cement, and other bulk materials on moving platforms have been difficult to obtain.

In view of the foregoing, there is a need in the art for weighing systems that are capable of accurately measuring materials, such as crops, as the material is carried on a vehicle that is subjected to dynamic forces and variable inclination. It would also be desirable for such weighing systems to be capable of use with a variety of materials environments, and vehicles.

SUMMARY OF THE INVENTION

Accurate weight measurement, particularly on moving vehicles, is becoming increasingly important as information technology becomes more widespread in agriculture, industry, business, and research. Accurate weight measurement allows operations such as agricultural operations to improve production while lowering overhead by allowing crop yield maps to be developed which enable an agriculturist to identify areas of an agricultural field that are underproducing. Once this information is known, appropriate action can be taken to increase the crop yield of those plots. The overall effect of accurate weight measurement is to increase the productivity of the agricultural operation.

In an agricultural context, the present invention relates to a weighing system that allows accurate weight measurements of the crop to be made as the crop is being harvested. For example, many harvesters have a conveyor or other transport mechanism that transports the harvested crop to a truck. The weighing system of the present invention can be incorporated with the conveyor, another transport mechanism, or can otherwise be integrated into the harvesting process such that the weight of the crop may be continually monitored and measured.

In one implementation of the invention, at least one weighing load cell (i.e., load cells that weigh the material) and a reference load cell are included in the weighing system. The axis of measurement of the weighing load cell and the axis of measurement of the reference are in a specified relationship one to another (preferably parallel) and remain so as the weighing load cell experiences linear and angular motion. The reference load cell generates data representing the measured weight of a known reference mass. The weighing load cell generates data representing the measured weight of the material to be weighed. The weighing load cell often will generate weight data that does not represent the actual weight of the material, due to acceleration of the material in the direction of the axis of measurement of the weighing load cell and deviation of the axis of measurement from the vertical direction.

As the acceleration and variable inclination are experienced, the output of the reference load cell is used to compensate for inaccuracies introduced into the data generated by the weighing load cell. The reference load cell can compensate for these inaccuracies because it experiences the same variable inclination and acceleration as the weighing load cell. The compensation is improved when the reference load cell and reference mass are selected to have a similar dynamic response to motion as the weighing load cell. It has also been found that passing the output of the reference load cell and the weighing load cell through low pass filters can reduce or eliminate potential mismatch in the measured dynamic characteristics (e.g., system resonant frequency) of the "reference" and "weighing" systems.

The invention also extends to novel techniques of measuring the electronic zero offset of the reference load cell. In order to accurately compensate for motion using the output of the reference load cell, it is important to know the electronic zero offset of the reference load cell, which in turn allows the output of the reference load cell associated with the reference mass to be determined. Prior to the invention, known techniques for determining the zero offset of a load cell, such as a full bridge strain gage load cell, without removing a known mass from the load cell included taking a static measurement of the reference mass, then taking another static measurement after rotating the entire assembly 180° about a horizontal axis. An average of the two static measurements eliminated the contribution of the known mass, and yielded the zero offset of the load cell.

According to one implementation of the invention, the zero offset is determined by sealing the reference load cell and the reference mass in a substantially air-tight chamber, such that dust accumulation is not present or is negligible. The output of the reference load cell in a static and level position is measured. Using the known mass of the reference load cell and a known value representing the mass per unit of voltage associated with the particular reference load cell, the zero offset of the particular reference load cell can be calculated without requiring removal of the reference mass or rotation of the reference load cell.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting, of its scope, the invention will be described and explained with additional specificity and detail through the use of the accompanying drawings in which.

DETAILED DESCRIPTION OF THE INVENTION

Figure 1:
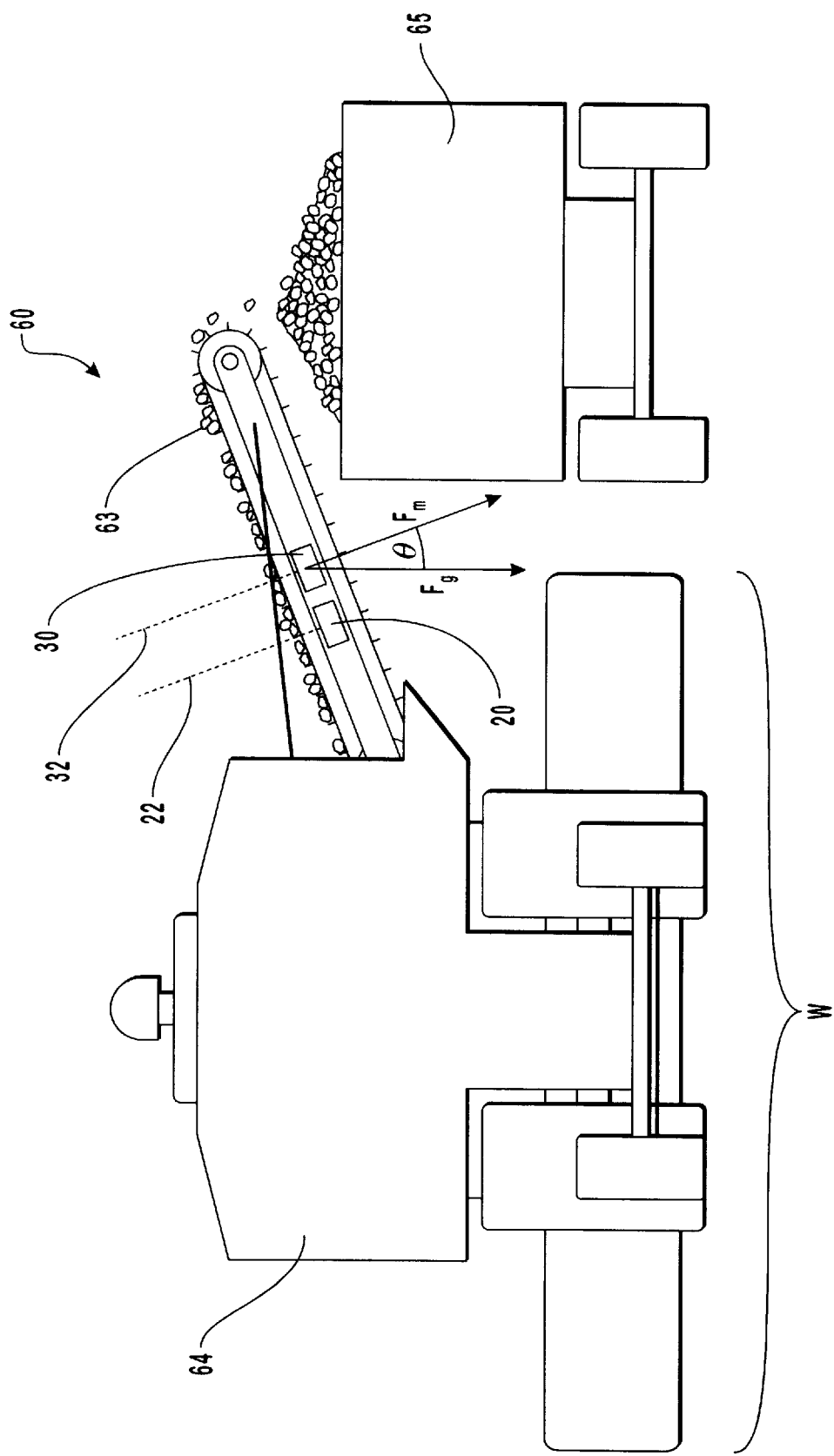
FIG. 1 illustrates a conveyor connected to a harvester and represents one environment in which the weighing systems of the invention can be used.

Accurate weight measurement in agricultural operations is becoming increasingly useful and necessary in order to maximize available resources. Traditionally, however, there are at least two problems that hinder the ability to take an accurate weight measurement. First, the motion of the vehicle on which the weight of a material is being measured causes acceleration of the material, which can generate inaccurate measurements. For instance a sudden vertical drop of the vehicle can result in a weight measurement that is lower than the actual weight. The second problem is that the motion of the vehicle results in the weighing platform deviating from the horizontal plane. As a result, this slope causes a weight to be measured that is different from the true or actual weight.

The present invention relates to systems and methods for measuring the weight of a material on a moving vehicle, while compensating for acceleration of the material and variable slope of the vehicle. The invention is described herein primarily in the context of measuring crops on agricultural equipment. However, general principles of the invention disclosed herein extend to weighing materials in other environments, such as those associated with industry, business and scientific research.

The embodiments of the present invention may be practiced using the weighing systems disclosed herein in combination with a processor, which can be included in a special purpose or general purpose computer comprising various computer hardware. Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices or any other medium which can be used to store the desired executable instructions or data structures and which can be accessed by a general purpose or special purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules being executed by one or more processors included, for example, in a field computer. Generally, program modules include routines, programs, objects, components, data structures, etc. that perform particular tasks or implement particular abstract data types. Moreover, those skilled in the art will appreciate that the invention may be practiced with other computer system configurations, including general purpose computers, analog computers, personal computers, hand-held devices, and the like.

The methods of weighing materials according to the invention are described herein with reference to a series of equations that can be performed by a processor. The equations presented herein represent only one example of the computational processes for obtaining a weight of a material that has been compensated for acceleration and variable inclination. Those skilled in the art, upon learning of the general principles of the invention disclosed herein, will recognize that other equations or computational methods can yield equivalent results, and the invention extends to such techniques.

The term "weighing load cell" refers to a load cell that generates data corresponding to the weight of the crops or other material to be weighed. The term "reference load cell" refers to a load cell that generates output that is used to adjust the data generated by the weighing load cell so as to compensate for acceleration, variation in the angular position of the weighing load cell, or both.

I. Exemplary Instrumentation and Measurement Environment

FIG. 1 illustrates an environment in which the systems and methods of the present invention may be utilized. In FIG. 1, conveyor 60 is mounted to harvesting equipment 64. Harvesting equipment 64 gathers or harvests crops 63 and deposits them on conveyor 60, which transports crops 63 from harvesting equipment 64 to a truck, wagons or gondola 65. In order to measure the weight of the crops as they are harvested, various measurement systems using at least one weighing load cell can be used. For example, when harvesting potatoes, ear corn, grapes, and many other crops, weight measurements of the harvested crops can be obtained by replacing one of the idler rollers of the conveyor with a weighing load cell. Examples of conveyors and harvesting equipment in which a weighing load cell is used in a conveyor are described in U.S. patent application Ser. No. 09/258,667, filed Feb. 26, 1999, which is incorporated herein by reference.

Other examples of conveyor systems using load cells, which can also be adapted for use with the invention include those disclosed in U.S. Pat. No. 5,959,257, to Campbell, et al., entitled "System for Weighing Material on a Conveyor," which is incorporated herein by reference. When the reference load cells of the invention and the techniques for compensating for acceleration and variable slope are used with the conveyor weighing systems disclosed in the foregoing '257 patent, the clinometers and the techniques for measuring and compensating for the angular orientation of the conveyor as described in the '257 patent can be eliminated.

Other crops can be measured by other weighing systems that use weighing load cells. For instance, U.S. Pat. No. 5,487,702 to Campbell et al. entitled "Grain Weighing, and Measuring System," is incorporated herein by reference and discloses a grain measuring and weighing device having two weighing load cells that weigh fixed volumes of grain in a weigh chamber. The foregoing examples of weighing systems and others that use weighing load cells to measure the weight of a material on a moving vehicle can generally be adapted for use with the invention.

As shown in FIG. 1, a weighing load cell 30 is positioned in conveyor 60 to measure the weight of crops 63 along a specified segment of the conveyor. Weighing load cell 30 has an axis of measurement 32 that is perpendicular to the plane that defines the weighing platform associated with the weighing load cell. Due to the nature of weighing load cell 30, the load cell measures the component of the weight that is perpendicular to the axis of measurement of the weighing load cell, rather than measuring the entire weight of crops 63. In general, the force $F_m$ measured by weighing load cell 30 in the direction of axis 32 is equal to the weight of the material, $F_g$ multiplied by the cosine of the tilt angle θ, which is defined as the angle between the axis of measurement 30 of weighing load cell 32 and the vertical direction. It is noted that the tilt angle θ can vary from the vertical with two degrees of rotational freedom as harvesting equipment 64 traverses a field.

The weighing system of FIG. 1 also has a reference load cell 20 that has an axis of measurement 22. Rather than measuring the weight of crops 63, reference load cell generates measurements corresponding to the weight of a known, reference load or mass that is permanently or semi-permanently affixed to the reference load cell. Reference load cell 20 is positioned to have a fixed mechanical position with respect to weighing load cell 30 such that the reference weight measured by the reference load cell varies in a similar manner to the variation of the weight measured by weighing load cell 30 as the harvesting equipment 64 experiences acceleration and variable inclination. Specifically, the fixed mechanical position according to one embodiment of the invention is defined by axis of measurement 22 of reference load cell 20 being parallel to axis of measurement 32 of weighing load cell 30.

Because the axes of measurement 22 and 32 are parallel in the embodiment of FIG. 1, reference load cell 20 measures a weight of the reference mass that is equal to the weight of the reference mass multiplied by the cosine of tilt angle θ. In a preferred embodiment, reference load cell 20 and the reference mass associated therewith are selected to generate a dynamic response to movement of harvesting equipment 64 that is similar to the dynamic response of weighing load cell 30. As harvesting equipment 64 traverses uneven terrain, harvesting equipment moves up and down and rotates about various axes, which results in the force exerted by crops 63 onto weighing load cell 30 and the force exerted by the reference mass onto the reference load cell dynamically changing and varying from what would otherwise be experienced in a static environment. The inclination of a conveyor associated with a vehicle is also sometimes variable with respect to the vehicle and the invention can also compensate for such motion. The output of reference load cell 20, with its known reference mass, can dynamically change due to the motion of harvesting equipment 64. This output, particularly when the dynamic responses of the load cells 20 and 30 are similar, can be used to compensate for the dynamic forces measured by weighing load cell 30, which would otherwise introduce error into the measurement.

Because the weight of the crops 63 measured by weighing load cell 30 generally varies over time, it is generally not possible to exactly match the dynamic response of the two load cells 20 and 30 with their respective masses. However, the accuracy of the measurements obtained by the invention generally improves when the dynamic responses of load cells 20 and 30 are more closely matched.

Figure 2:
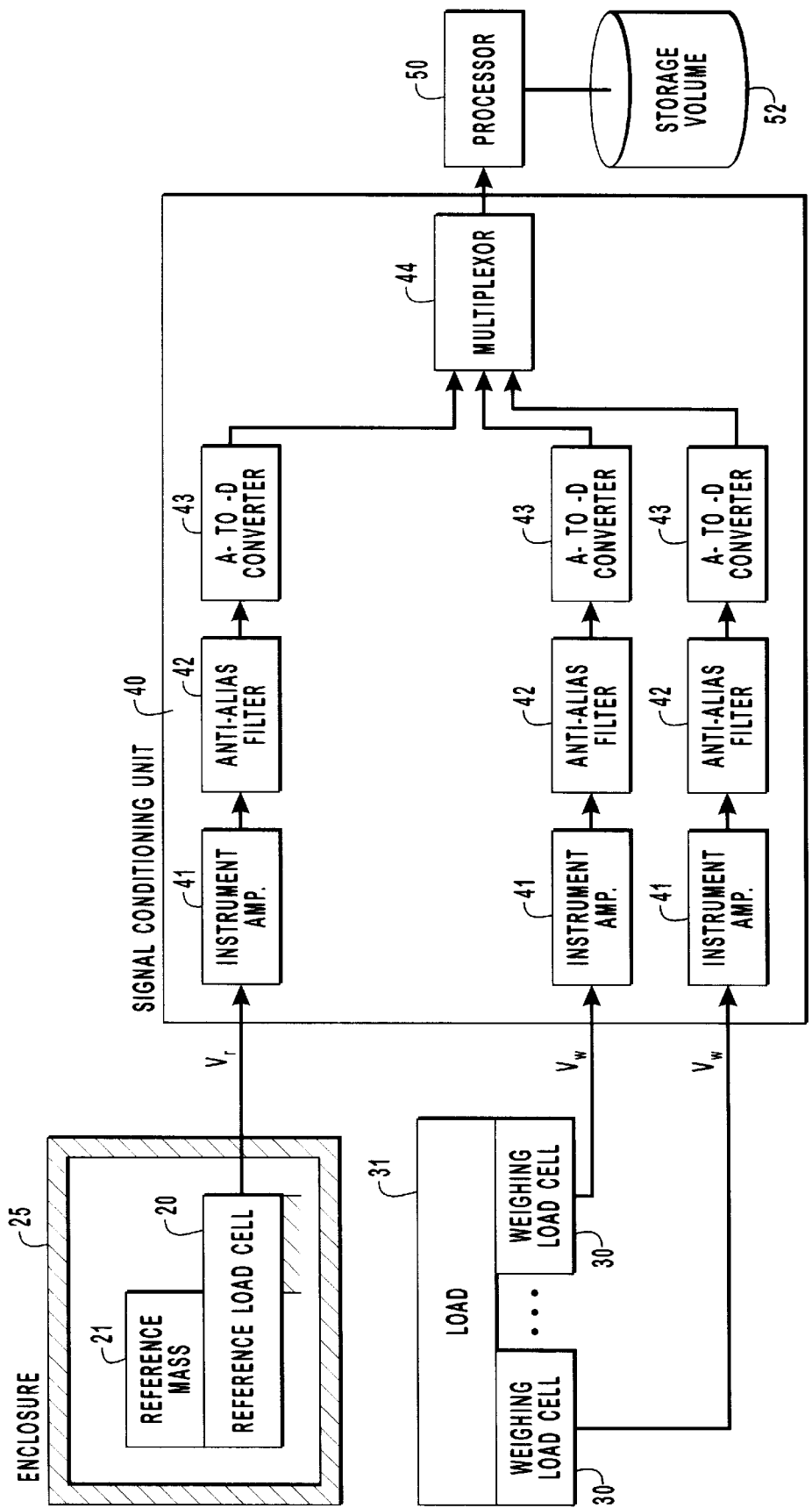
FIG. 2 illustrates selected components of a weighing system that weighs a load that is both on a variably sloped surface and subject to dynamic forces.

FIG. 2 is a block diagram illustrating in greater detail the instrumentation and processing modules associated with the weighing system of FIG. 1. The weighing system includes one or more weighing load cells 30 that generate an output signal that is associated with the force applied by load 31 on the weighing load cells. The output of weighing load cells 30 is transmitted to signal conditioning unit (SCU) 40, which also receives the output of reference load cell 20. These outputs are filtered, digitized and transmitted to processor 50 by SCU 40. Processor 50 determines the true or actual weight of load 31 by using the output of reference load cell 20 to correct the output signals of weighing load cells 30. Reference load cell 20 generates an output signal that is associated with the force applied by reference mass 21 on the reference load cell. Reference load cell 20 is an example of reference means for obtaining a reference weight or for producing a reference signal which is indicative of a reference weight. Weighing load cells 30 represent an example of weighing means for obtaining a measured weight of a load or for producing a weigh signal that is indicative of a measured weight.

In one preferred embodiment, reference load cell 20 and weighing load cells 30 are full bridge strain gages load cells, although these components can be other sensors that detect weights. One advantage of using full bridge strain gage load cells is that they are insensitive to temperature variation. Moreover, this type of load cell has an electronic zero offset and gain that are generally highly stable over time, the importance of which will become evident hereinafter.

II. Methods for Weighing Material

One of the basic principles of the invention relates to the use of the reference load cell to generate reference data associated with the measured weight of a reference mass. The reference data is used to convert the signal generated by the weighing load cell, which may be subject to acceleration and variable inclinations to data that represents the actual weight of the material that is being weighed.

An exemplary method of weighing a material according to the invention is described in the following paragraphs in reference to FIGS. 2 and 3. In order to determine which portion of the reference load cell signal corresponds to the reference mass, and which portion corresponds to the zero offset value inherently associated with the reference load cell, the methods for weighing the material according to one embodiment of the invention begin in step 100 of FIG. 3 by deriving the zero offset using known and measured data. The zero offset value for any particular reference load cell 20 of FIG. 2 is generally stable over time, but varies from instrument to instrument.

As noted previously, prior techniques for identifying the zero offset value associated with a load cell involved removing any mass positioned on the load cell or manipulating the angular orientation of the load cell. Manipulation of the angular orientation of the load cell would be performed by taking a first measurement of a reference mass with the axis of measurement of the load cell aligned in a first direction, reversing the direction of the axis of measurement by rotating the load cell 180° about a horizontal axis, and then taking a second measurement of the reference mass. An average of the first and second measurements cancels the contribution of the reference mass, leaving only the zero offset.

In most environments in which the weighing systems of the invention are used, it is highly impractical to remove the reference mass or physically rotate the reference load cell in order to identify the zero offset value. According to a preferred embodiment of the invention, the zero offset value is identified by using the known mass of reference mass 21 and a known value representing the magnitude of the output signal per unit mass associated with the particular reference load cell. Changes in reference mass 21 can be prevented by maintaining the reference load cell 20 and the reference mass in a substantially airtight housing or enclosure 25 such that dust or other foreign materials do not accumulate on the reference mass.

Prior to beginning the harvesting process, the user initiates a preliminary measurement of reference mass 21 with reference load cell 20 while the reference load cell is static and while the axis of measurement of the reference load cell is vertical (i.e., the measurement platform of the reference load cell is level) or in another known orientation. The analog output signal of reference load cell 20 is processed by signal conditioning unit 40 and sent to processor 50. Processor 50 then calculates the zero offset value of reference load cell 20 using the known mass of reference mass 21 and the known value representing the magnitude of the output signal per unit mass associated with the reference load cell. The magnitude of the output signal per unit mass, which is relatively stable over time, is typically available from the manufacturer of the reference load cell or can be calculated.

These known values are stored, for example, in storage volume 52 of FIG. 2. Assuming the reference load cell is level, one example of equations that yield the zero offset is as follows, where $K_r$ is the known value representing weight per unit magnitude of the output signal of the reference load cell, $W_k$ is the weight of the known reference mass, $V_{r\text{-}static}$ is the voltage of the analog output of the static reference load cell, $W_{ref\text{-}static}$ is the calculated gross reference weight associated with the output of the static reference load cell, and $W_{rz}$ is the calculated zero offset of the reference cell:

$$W_{ref\text{-}static} = V_{r\text{-}static} * K_r; \qquad (1)$$

and $$W_{rz} = W_{ref\text{-}static} - W_k. \qquad (2)$$

Combining equations 1 and 2 yields:

$$W_{rz} = V_r * K_r - W_k. \qquad (3)$$

The following example illustrates the computation of $W_{rz}$. A typical reference load cell 20 may have a 5.0 kg capacity, while being used with a reference mass of 2.0 kg. The value of K for the particular reference load cell is known to be 0.333 Kg/mV in this example. Assuming that the output of the reference load cell has been measured at 6.741 mV in the initial calibration step, the zero offset value, $W_{rz}$, can be calculated using equation 3:

$$W_{rz} = (6.741 \text{ mV} * 0.333 \text{ kg/mV}) - 2.0 \text{ kg} = 0.245 \text{ kg}.$$

This value (0.245 kg) is stored, for example, in storage volume 52 for future use in the crop weighing process as described below. It is noted that the exemplary equations disclosed herein can be adapted as desired so that the units are expressed in terms of force (i.e., weight) or mass, and that force and mass can be readily inferred one from another and are often used interchangeably in the relevant industry.

Figure 3:
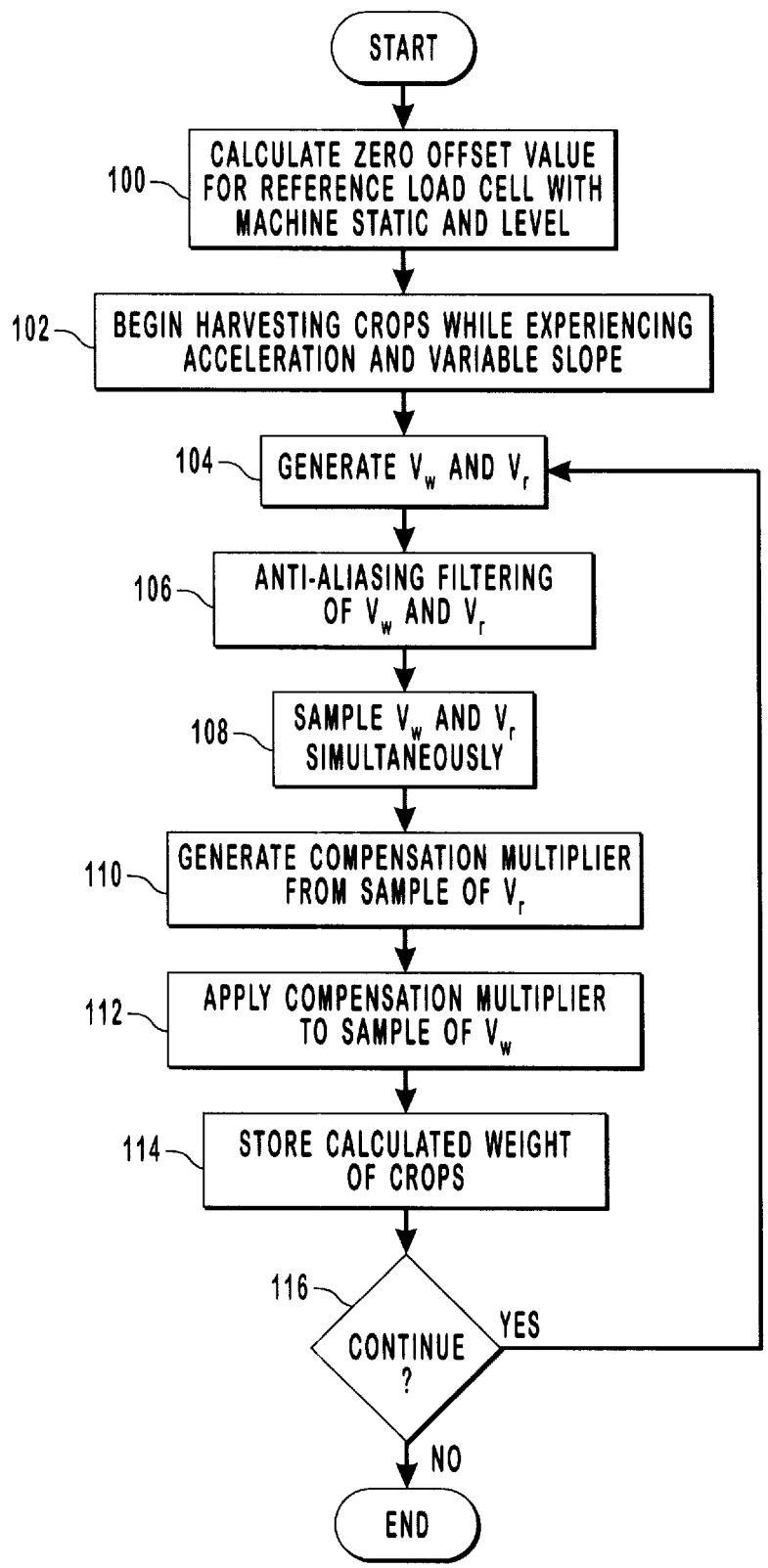
FIG. 3 is a flowchart illustrating a method of determining the weight of material using the system of FIG. 2.

The user then proceeds to harvest the crops in step 102 of FIG. 3 while using the weighing system of FIG. 2 to weigh the harvested crops (i.e., load 31). The output signals of weighing load cells 30 ($V_w$) and the output signal of reference load cell 20 ($V_r$) are generated (step 104 of FIG. 3) and filtered in a preferred embodiment (step 106) using anti-alias filters 42 of FIG. 2.

Anti-alias filters 42 prevent the output signals of weighing load cells 30 and reference load cell 20 from being aliased by the higher vibration frequencies of the vehicle in which the weighing system is used and eliminates much of the noise that might be generated as the vehicle vibrates and traverses uneven terrain. Stated another way, the anti-alias filters 42 reduce or eliminate the potential mismatch in the measured dynamic characteristics (e.g. system resonant frequency) of the reference load cell 20 and the weighing load cells 30. Thus, anti-alias filters 41 can be any low pass filter that suitably reduces or eliminates the aliasing effects that might be otherwise experienced. It has been observed that the frequency of the motion caused by rough terrain as a harvester traverses a field is typically less than 10 Hz. Thus, in one embodiment, the anti-alias filters 41 comprise a flat low pass filter.

SCU 40 samples the outputs at a frequency at least twice the cutoff frequency of anti-alias filters 41, which would be at least 20 Hz in the example of FIG. 2. It has been found that the use of anti-alias filters 41, the accuracy of the measured weight can be significantly improved compared to the accuracy in the absence of the anti-alias filters. In many, but not all, mechanical environments, it has been found that useful measurements can be obtained only by using a filtering process, examples of which have been disclosed herein.

In order to compensate for the vibration and dynamic response of the machinery, the cutoff frequencies of the low pass filters are selected so that the weigh signal and the reference signal are similarly filtered. The cutoff frequency depends on the dynamic characteristics of the machinery in which the systems are used. Cutoff frequencies of the low pass filters in a range from about 2 Hz to about 20 Hz are common, although different filtering may be required in some applications. Judicious tuning of the filters can be required especially in situations where the dynamic characteristics of the reference load cell and the weighing load cell are not closely matched.

In step 108 of FIG. 3, the signals $V_w$ and $V_r$ are sampled and converted to digital representations of the analog signals using, for example, analog-to-digital converters 43 of FIG. 2. The signals are then multiplexed by multiplexor 44. Due to the acceleration and variable inclination experienced as the crops are harvested, $V_w$ often represents something other than the actual weight of the crops. In step 110 of FIG. 3, $V_r$ is used to repeatedly calculate a compensation multiplier, Q, which is used to adjust the weight measured by the weighing load cells 30 of FIG. 2. The compensation multiplier, Q, can be calculated using, for example, equation 4, where $V_r$ is the voltage represented by the samples of the output of the reference load cell, $W_k$ is the known weight of the reference mass, and $W_{rz}$ is obtained from equation 3:

$$Q = W_k / (V_r * K_{rf} - W_{rz}). \quad (4)$$

The actual weight, W, of load 31, which is the weight value having been corrected for acceleration and variable inclination of weighing load cells 30, is computed using Q in, for example, the following equation (step 112 of FIG. 3).

$$W = (W_g - W_e) * Q - W_t. \quad (5)$$

In equation 5, $W_g$ is the gross weight measurement generated by the weighing load cell, $W_e$ is the electronic zero offset of the weighing load cell, and $W_t$ is the tare weight of the empty measurement platform used with the weighing load cell. In general, $W_g$, which is calculated from $V_w$, includes components associated with the weight of the material being weighed, the electronic zero offset of the weighing load cell, and the tare weight. In equation 5, $W_e$ is subtracted from $W_g$ prior to applying the compensation multiplier, since the electronic zero offset constant and does not respond to acceleration or slope. In contrast, $W_t$ is not subtracted until after applying the compensation multiplier to $W_g$, since the tare weight responds to acceleration and slope.

In order to obtain the value W in equation 5, the values of $W_t$ and $W_e$ should already have been obtained. For example, $W_t$ and $W_e$ can be determined prior to beginning the harvesting and weighing operations $W_e$ is initially determined and remains fixed during operation of the harvesting equipment and the weighing system. If $W_e << W_g$ during operation, then $W_e$ can be ignored. If $W_e$ is ignored, it should be ignored not only in equation 5, but also when calculating the tare weight, $W_t$.

Using equation 5, the calculated value W represents the true or actual weight of the crops or other measured material, having been adjusted to compensate for dynamic forces and variable slope of the sensors. The actual weight W can then be stored (step 114 of FIG. 3) for later use or reference in, for example, storage volume 52 of FIG. 2. As shown in FIG. 3, the weighing process shown at steps 104–114 can be repeated throughout the harvesting process as illustrated by decision block 116.

SCU 40 and processor 50 represent an example of compensation means for adjusting the measured weight of a load or material to determine the true or actual weight of the load or material. While there is, of course, residual error in the measurements of the invention, some of which arise from the inherent inability to precisely match the dynamic responses of the reference load cell and the weighing load cell, the weight measurements of the invention can be markedly improved over those obtained using conventional techniques. The terms "actual" or "true" weights refer to the measurements obtained according to the invention by compensating for acceleration and or slope, notwithstanding the residual errors that often exist.

III. Exemplary Weighing Systems

Figure 4:
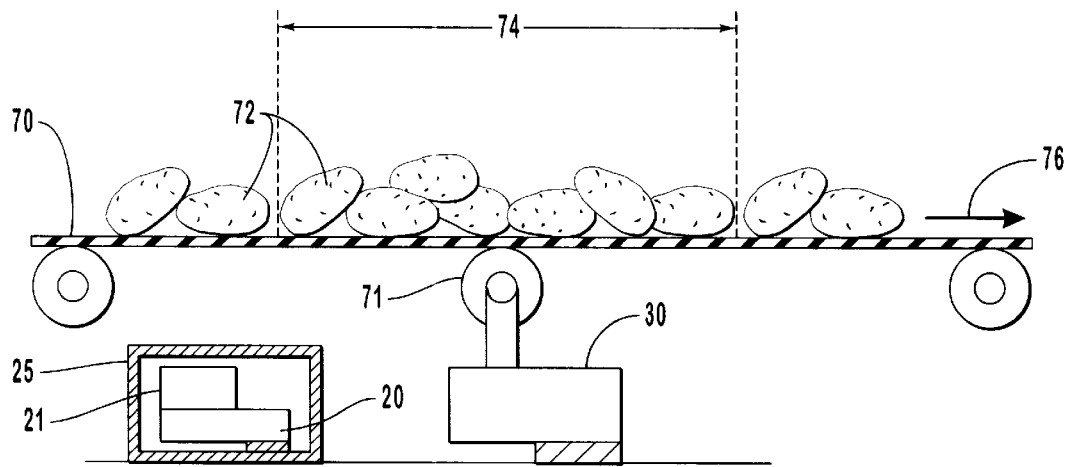
FIG. 4 illustrates a weighing system of the invention that is used with a conveyor where the weighing elements continuously sample the weight of a segment of the moving conveyor.

FIG. 4 is a block diagram illustrating a weighing system for a conveyor. Conveyor 70 is connected to weighing load cell 30 which is capable of weighing a portion of conveyor 70. For example, weighing load cell 30 as illustrated in FIG. 4 may be combined with an idler wheel 71 of the conveyor. Examples of conveyors having weighing load cells combined with idler wheels are disclosed in U.S. patent application Ser. No. 09/258,667, which has been incorporated herein by reference.

Weighing load cell 30 is capable of continuously measuring the weight of crop 72 on a segment of conveyor 70 as shown at 74 in FIG. 4. Because the speed 76 of conveyor 70 is known or measured, the mass flow rate of crop 72 can be continuously measured. Reference load cell 20 is also connected to conveyor 70 such that reference load cell 20 and reference mass 21 experience the same acceleration and slope experienced by weighing load cell 30. During operation of conveyor 70, the weight of crop 72 is computed as described above, with the output of reference load cell 30 compensating for acceleration and variable slope of reference load cell 20.

Figure 5A:
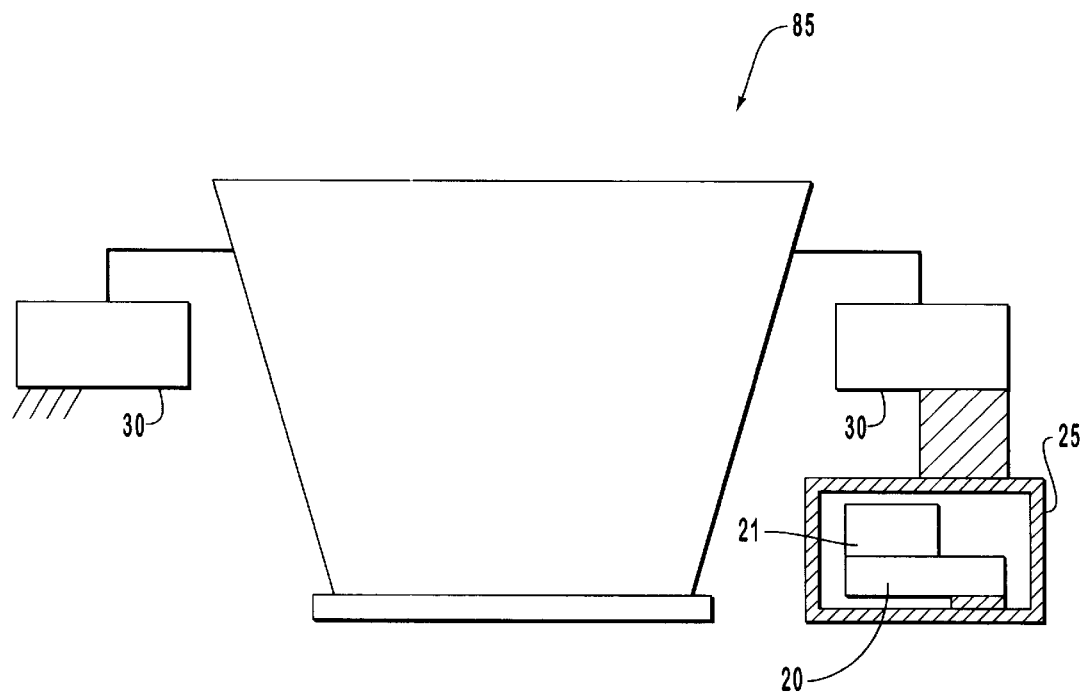
FIG. 5a depicts a weighing system of the invention that is used to weigh material in a fixed-volume weigh chamber.
Figure 5B:
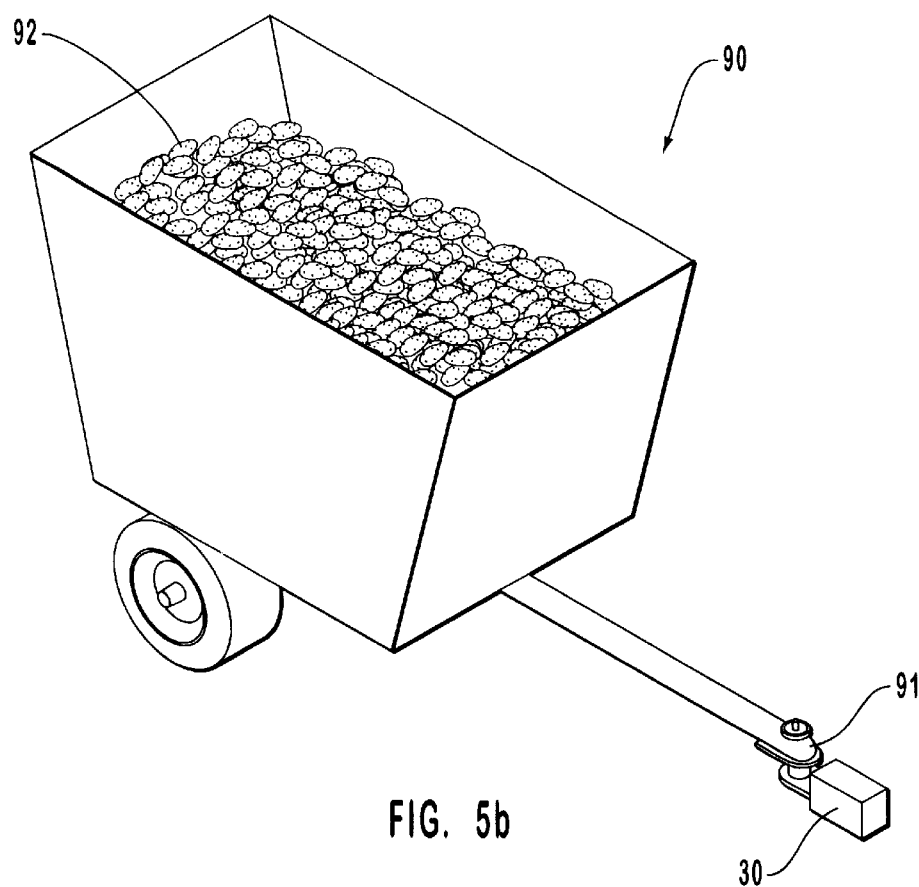
FIGS. 5b and 5c represent a weighing system of the invention that is used to weigh a material in a feed wagon.
Figure 5C:
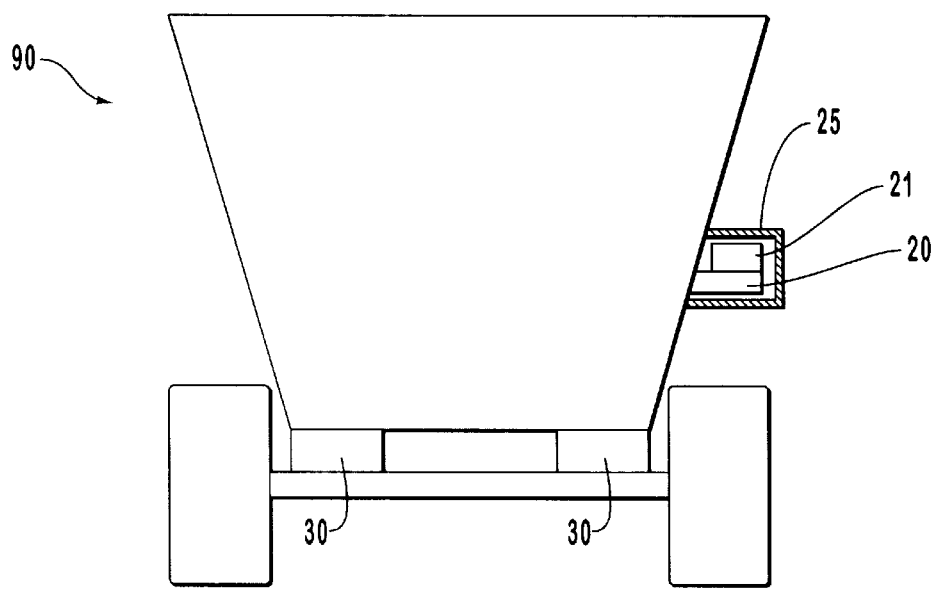

FIGS. 5a–5c illustrate other systems in which the weighing systems of the present invention may be utilized. FIG. 4a illustrates weigh chamber 85 supported by a plurality of weighing load cells 30. The forces on weigh chamber 85 resulting from the motion of the vehicle that carries the weigh chamber are evident in the output of weighing load cells 30. In order to account for the effect of the acceleration and the slope of chamber 85, reference load cell 20 and reference mass 21 are placed, as described previously, such that they are subject to the same forces and slope that weighing load cells 30. In this manner, the actual weight of the material in chamber 85 may be measured. One example of a chamber illustrated generally in FIG. 5a is described in greater detail in U.S. Pat. No. 5,487,702 to Campbell et al., which has been incorporated herein by reference.

FIGS. 5b and 5c illustrate a feed wagon 90, which is used, for example, to distribute feed 92 to livestock. It is often desirable to monitor the amount of feed 92 provided to livestock so that costs can be lowered by providing only the amount of feed actually needed. In this example, feed wagon 90 is loaded with a known weight of feed and as the feed is distributed, the weight is monitored by the weighing system of the present invention such that the prescribed amount is actually delivered to the animals. To accomplish this, weighing load cells 30 can be located at tongue 91 and underneath body 92 of feed wagon 90 in order to monitor the weight of feed wagon 90. Also reference load cell 20 and reference mass 21 are placed on feed wagon 90 in order to account for the effects of slope and motion evident in the output of weighing load cells 30. Vehicles other than those specifically illustrated herein can also be used with the invention, and the position of the weighing load cells 30 and reference load cell 20 can be different from the positions illustrated in the accompanying drawings. The structure illustrated in FIGS. 5b and 5c can also represent a gondola or trailer that receives and accumulates crops that are harvested by harvesting equipment. When used in this manner, wagon 90 and the weighing system of the invention can be used to measure the increasing weight of the crops that are deposited in the wagon.

The weighing systems of the invention can be used to plot the harvested yield of crops on a map representing a field. The weighing systems are capable of generating data representing a series of weight measurements or a weight flow rate of crops as they are harvested. As noted previously, accurate weight measurements of material carried in trucks leaving the field can be critical for avoiding overloaded trucks and potential overload penalties and also for enabling processing plants to become aware of how much crop is being delivered. For example, the weighing systems and methods of the invention can be combined with telecommunication between the harvester or shipper and the processing plant to allow the plant to prepare for deliveries of known quantities of products.

This weight data, combined with positional data generated by a global positioning receiver may also be used to generate a weight or volume yield map of the field from which the crops are harvested. Other measurements or data that often are useful in generating such yield maps include the width of the swath that is harvested by the harvesting equipment, the forward speed of the harvesting equipment, the speed of the conveyor (if any) included in the harvesting equipment, the density of the crops, and the packing ratio of the harvested crops. Further information relating to generating yield maps using the weighing systems of the invention is found in U.S. Pat. No. 5,959,257 and U.S. patent application Ser. No. 09/258,667.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning, and range of equivalency of the claims are to be embraced within their scope.

What is claimed and desired to be secured by United States Letters Patent is:

1. A system for measuring an actual weight of a material using a weighing load cell, notwithstanding acceleration or a variable slope experienced by the weighing load cell, the system comprising:

a weighing load cell that is capable of generating a first output signal associated with a force applied to the weighing load cell by a material;

a reference load cell that is capable of generating a second output signal that is associated with a force applied to the reference load cell by a reference mass, the reference load cell being mechanically related to the weighing load cell such that variation in the slope of the weighing load cell is also experienced by the reference load cell and acceleration experienced by the weighing load cell are also substantially experienced by the reference load cell;

a first anti-alias filter that filters the first output signal;

second anti-alias filter that filters the second output signal; and a processor for determining the actual weight of the material using:

means for evaluating the second output signal to determine a compensation multiplier that is indicative of the effects of said variation in the slope and said acceleration experienced by the reference load cell and also is indicative of the effects of said variation in the slope and said acceleration experienced by the weighing load cell; and means for determining the actual weight of the material by multiplying the compensation multiplier with a measured weight of the material that has been obtained by the weighing load cell using the first output signal, thereby compensating for said variable slope and said acceleration experienced by the weighing load cell.

2. A system as defined in claim 1, wherein the reference load cell comprises a full bridge strain gage load cell.

3. A system as defined in claim 1, wherein the weighing load cell comprises a full bridge strain gage load cell.

4. A system as defined in claim 1, wherein the weighing load cell is positioned to measure the force applied to the weighing load cell as the material is carried on at least a portion of a conveyor.

5. A system as defined in claim 1 wherein the weighing load cell is positioned in a vehicle to measure the force applied to the weighing load cell as the material is carried by the vehicle, the weighing load cell being positioned such that a tare weight associated with the weighing load cell includes at least a portion of the weight of the vehicle.

6. A system as defined in claim 1, further comprising a weigh chamber for receiving the material, the weighing load cell being operably coupled with the weigh chamber to measure the force applied to the weighing load cell as the material is in the weigh chamber.

7. A system as defined in claim 1, further comprising analog to digital converters for digitizing the first output signal and the second output signal.

8. A system as defined in claim 1, wherein each of the first anti-alias filter and the second anti-alias filter comprises a flat low pass filter.

9. A system as defined in claim 8, wherein the first anti-alias filter and the second anti-alias filter have substantially the same frequency characteristics.

10. A system for measuring an actual weight of a material carried by a conveyor using a weighing load cell, notwithstanding acceleration or a variable slope experienced by the weighing load cell, the system comprising:

a weighing load cell that is capable of generating a first output signal associated a force applied to the weighing load cell by a material on at least a portion of the conveyor as the material is carried by the conveyor;

a reference load cell that is capable of generating a second output signal that is associated with a force applied to the reference load cell by a reference mass, the reference load cell being mechanically related to the weighing load cell such that variation in the slope of the weighing load cell is also experienced by the reference load cell and acceleration experienced by the weighing load cell are also substantially experienced by the reference load cell: and a processor for determining the actual weight of the material using:

means for evaulating the second output signal to determine a compensation multiplier that is indicative of the effects of said variation in the slope and said acceleration experienced by the reference load cell and also is indicative of the effects of said variation in the slope and said acceleration experienced by the weighting load cell; and means for determining the actual weight of the material by multiplying the compensation multiplier with a measured weight of the material that has been obtained by the weighing load cell using the first output signal, thereby compensating for said variable slope and said acceleration experienced by the weighing load cell.

11. A system as defined in claim 10, further comprising the conveyor.

12. A system as defined in claim 11 wherein the weighing load cell is coupled with an idler roller of the conveyor.

13. A system as defined in claim 10, wherein the weighing load cell has an axis of measurement that is substantially parallel to an axis of measurement of the reference load cell.

14. A system as defined in claim 10, further comprising a substantially airtight enclosure that encloses the reference load cell and the reference mass.

15. A system as defined in claim 10, further comprising:

a first anti-alias filter that filters the first output signal; and a second anti-alias filter that filters the second output signal.

16. A system for measuring an actual weight of a material carried by a vehicle using a weighing load cell, notwithstanding acceleration or a variable slope experienced by the weighing load cell, the system comprising:

a weighing load cell that is capable of generating a first output signal associated with a force applied to the weighing load cell by a material carried by a vehicle;

a reference load cell that is capable of generating a second output signal that is associated with a force applied to the reference load cell by a reference mass, the reference load cell being mechanically related to the weighing load cell such that variation in the slope of the weighing load cell is also experienced by the reference load cell and acceleration experienced by the weighing load cell are also substantially experienced by the reference load cell; and a processor for determining the actual weight of the material using:

means for evaluating the second output signal to determine a compensation multiplier that is indicative of the effects of said variation in the slope and said acceleration experienced by the reference load cell and also is indicative of the effects of said variation in the slope and said acceleration experienced by the weighting load cell; and means for determining the actual weight of the material by multiplying the compensation multiplier with a measured weight of the material that has been obtained by the weighing load cell using the first output signal, thereby compensating for said variable slope and said acceleration experienced by the weighing load cell.

17. A system as recited in claim 16, wherein the vehicle capable of receiving crops that are harvested from a field.

18. A system as recited in claim 16, wherein the vehicle carries animal feed to be distributed to livestock.

19. A system as recited in claim 16, further comprising the vehicle, wherein the weighing load cell is positioned in the vehicle such that a tare weight associated with the weighing load cell includes the weight of at least a portion of the structure of the vehicle.

20. A system as recited in claim 19, further comprising at least two weighing load cells, each being positioned in the vehicle such that a tare weight associated with the weighing load cell includes the weight of at least a portion of the structure of the vehicle.

21. A system as recited in claim 10, further comprising:

a first anti-alias filter that filters the first output signal; and a second anti-alias filter that filters the second output signal.

22. In a weighing system including a weighing load cell and a reference load cell, a method for measuring an actual weight of a material using the weighing load cell, notwithstanding acceleration or a variable slope experienced by the weighing load cell, the method comprising:

as the weighing load cell experiences acceleration and variable slope, generating a first output signal using the weighing load cell, wherein the first output signal is associated with a force applied to the weighing load cell by a material;

as the reference load cell substantially experiences said acceleration and said variable slope, generating a second output signal using the reference load cell, wherein the second output signal is associated with a force applied to the reference load cell by a reference mass;

passing the first output signal through a first anti-alias filter and the second output signal through a second anti-alias filter;

generating samples of the first output signal and, substantially simultaneously, generating samples of the second output signal; and for each sample of the first output signal:

calculating a compensation multiplier based on a ratio between a known actual weight of the reference mass and a measured weight of the reference mass that has been obtained by the reference load cell using the corresponding sample of the second output; and determining the actual weight of the material based on the samples of the first output signal by multiplying a measured weight of the material that has been obtained by the weighing load cell with the compensation multiplier to compensate for said variable slope and said acceleration experienced by the weighing load cell.

23. A method as recited in claim 22, wherein:

calculating the compensation multiplier is performed based on the corresponding sample of the second output signal, a zero offset value associated with the reference load cell, and a known value of the reference mass.

24. A method as recited in claim 22, wherein:

the material comprises a crop;

the method further comprises the step of harvesting the crop; and the step of generating the first output signal is conducted as the harvested crop is carried on a conveyor.

25. A method as recited in claim 22, wherein:

the material comprises a crop;

the method further comprises the step of harvesting the crop; and the step of generating the first output signal is conducted as the harvested crop is positioned in a weigh chamber operably coupled with the weighing load cell.

26. A method as recited in claim 22, wherein the material is carried by a vehicle, the step of generating the first output signal being conducted as a total weight of the material carried by the vehicle increases or decreases.

27. A method as recited in claim 22, wherein each of the first anti-alias filter and the second anti-alias filter comprises a flat low pass filter.

28. A method as defined in claim 27, wherein the flat low pass filters have a cutoff frequency in a range from about 2 Hz to about 20 Hz.

29. In a weighing system including a weighing load cell and a reference load cell, a method for measuring an actual weight of a material using the weighing load cell, notwithstanding acceleration or a variable slope experienced by the weighing load cell, the method comprising:

carrying a material on a conveyor equipped with a weighing load cell;

as the weighing load cell experiences acceleration and variable slope associated with motion of the conveyor, generating a first output signal using the weighing load cell, wherein the first output signal is associated with a force applied to the weighing load cell by a material carried on at least a portion of the conveyor;

as the reference load cell substantially experiences said acceleration and said variable slope associated with said motion of the conveyor, generating a second output signal using the reference load cell, wherein the second output signal is associated with a force applied to the reference load cell by a reference mass;

evaluating the second output signal to determine a compensation multiplier that is indicative of the effects of said acceleration and said variable slope experienced by the reference load cell and also is indicative of the effects of said acceleration and said variable slope experienced by the weighing load cell; and determining the actual weight of the material by multiplying the compensation multiplier with a measured weight of the material that has been obtained by the weighing load cell using the first output signal to compensate for said variable slope and said acceleration experienced by the weighing load cell.

30. A method as recited in claim 29, wherein the material comprises a crop, further comprising the step of harvesting the crop using harvesting equipment, the acceleration and the variable slope resulting from the harvesting equipment traversing a field.

31. A method as recited in claim 29, wherein the weighing load cell is coupled with an idler roller of the conveyor.

32. A method as recited in claim 29, further comprising the steps of:

passing the first output signal through a first anti-alias filter; and passing the second output signal through a second anti-alias filter.

33. A method as recited in claim 32, wherein:

the method further comprises the steps of:

repeatedly obtaining a first sample of the first output signal; and repeatedly obtaining a second sample of the second output signal that is obtained substantially simultaneously with the first sample; and the step of determining the actual weight is repeatedly conducted based on the first samples and the second samples.

34. In a weighing system including a weighing load cell and a reference load cell, a method for measuring an actual weight of a material using the weighing load cell, notwithstanding acceleration or a variable slope experienced by the weighing load cell, the method comprising:

carrying a material on a vehicle equipped with a weighing load cell and a reference load cell;

as the weighing load cell experiences acceleration and variable slope associated with motion of the conveyor, generating a first output signal using the weighing load cell, wherein the first output signal is associated with a force applied to the weighing load cell by a material carried the vehicle;

as the reference load cell substantially experiences said acceleration and said variable slope associated with said motion of the conveyor, generating a second output signal using the reference load cell, wherein the second output signal is associated with a force applied to the reference load cell by a reference mass;

evaluating the second output signal to determine a compensation multiplier that is indicative of the effects of said acceleration and said variable slope experienced by the reference load cell and also is indicative of the effects of said acceleration and said variable slope experienced by the weighing load cell; and determining the actual weight of the material by multiplying the compensation multiplier with a measured weight of the material that has been obtained by the weighing load cell using the first output signal to compensate for said variable slope and said acceleration experienced by the weighing load cell.

35. A method as recited in claim 34, wherein the total weight of the material carried on the vehicle is variable as the step of determining the actual weight is repeatedly conducted.

36. A method as recited in claim 34, wherein the material comprises a crop, further comprising, as the step of determining the actual weight of tile material is repeatedly conducted, the steps of:

harvesting the crop; and depositing the crop in the vehicle.

37. A method as recited in claim 34, wherein the material comprises animal feed, the method further comprising the step of removing some of the animal feed from the vehicle as the step of determining the actual weight of the material is repeatedly conducted.

38. A method as recited in claim 34, further comprising:

passing the first output signal through a first anti-alias filter; and passing the second output signal through a second anti-alias filter.

39. In a weighing system including a weighing load cell and a reference load cell, a method for measuring an actual weight of a material using the weighing load cell, notwithstanding acceleration or a variable slope experienced by the weighing load cell, the method comprising the steps of:

determining a zero offset value associated with the reference load cell, including the steps of:
   while the reference load cell carries a known reference mass and is substantially static, detecting the voltage of a preliminary output signal of the reference load cell; and
   calculating the zero offset value using the mass of the known reference mass and a value representing the unit mass of the reference mass per unit magnitude of the output signal associated with the reference load cell; and
as the weighing load cell experiences at least one of acceleration and variable slope, using the calculated zero offset value and a signal generated by the reference load cell to obtain an actual weight of the material that is weighed by the weighing load cell by compensating for said at least one of acceleration and variable slope.

40. A method as recited in claim 39, wherein the step of determining the zero offset value is conducted without removing a reference mass from the reference load cell and without rotating the reference load cell between any successive measurements.

41. A method as recited in claim 39, wherein the reference load cell is substantially level during the step of determining the zero offset.

42. A method as recited in claim 39, further comprising the steps of:
   passing a signal generated by the weighing load cell through a first anti-alias filter; and
   passing the signal generated by the reference load cell through a second anti-alias filter.

* * * * *

UNITED STATES PATENT AND TRADEMARK OFFICE
CERTIFICATE OF CORRECTION

PATENT NO.    : 6,313,414 B1
DATED         : November 6, 2001
INVENTOR(S)   : Ronald H. Campbell It is certified that error appears in the above-identified patent and that said Letters Patent is hereby corrected as shown below:

Title page,
Item [57], ABSTRACT,
Line 1, after "weighing" insert -- system for weighing --
Line 13, before "zero" change "an" to -- a --
Item [56], References Cited, U.S. PATENT DOCUMENT, change "5,695,354" to -- 5,696,354 --

Column 1,
Line 15, "operations" insert comma

Column 2,
Line 5, after "gravel" insert comma
Line 12, after "materials" insert comma Column 3,
Line 44, before "depict" change "drawing" to -- drawings --

Column 4,
Line 9, after "instance" insert a comma

Column 5,
Line 26, before "or gondola" change "wagons" to -- wagon, --
Line 52, after "et al." insert a comma Column 7,
Line 25, after "variable" change "inclinations" to -- inclination, --

Column 8,
Line 36, before "the particular" change "Kfor" to -- $K_r$ for --

Column 9,
Line 3, after "field" insert -- that --
Line 53, before "the tare" change "$W_t$is" to -- $W_t$ is --

Column 11,
Line 17, after "drawings." begin a new paragraph
Line 57, after "meaning" delete comma
Line 58, after "claims" change "arc" to -- are --

UNITED STATES PATENT AND TRADEMARK OFFICE
CERTIFICATE OF CORRECTION

PATENT NO. : 6,313,414 B1
DATED : November 6, 2001
INVENTOR(S) : Ronald H. Campbell It is certified that error appears in the above-identified patent and that said Letters Patent is hereby corrected as shown below:

<u>Column 12,</u>
Line 11, before "second" insert -- a --

<u>Column 13,</u>
Line 16, before "load" change "weighting" to -- weighing --

Signed and Sealed this

Second Day of March, 2004

JON W. DUDAS
*Acting Director of the United States Patent and Trademark Office*